United States Patent
Baek et al.

(10) Patent No.: US 9,225,282 B2
(45) Date of Patent: Dec. 29, 2015

(54) METHODS AND APPARATUSES FOR CONTROLLING OUTPUT VOLTAGES OF INVERTERS DRIVING ELECTRIC MOTORS

(71) Applicant: Samsung Electronics Co., Ltd., Suwon-Si, Gyeonggi-Do (KR)

(72) Inventors: Jei-hoon Baek, Seoul (KR); Jong-soo Kim, Suwon-si (KR); Hyun-bae Kim, Yongin-si (KR); Kyu-bum Han, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 53 days.

(21) Appl. No.: 13/932,331

(22) Filed: Jul. 1, 2013

(65) Prior Publication Data

US 2014/0070755 A1 Mar. 13, 2014

(30) Foreign Application Priority Data

Sep. 11, 2012 (KR) .................. 10-2012-0100652

(51) Int. Cl.
*H02P 23/00* (2006.01)
*H02P 27/08* (2006.01)

(52) U.S. Cl.
CPC .............. *H02P 27/08* (2013.01); *H02P 27/085* (2013.01)

(58) Field of Classification Search
None
See application file for complete search history.

(56) References Cited

U.S. PATENT DOCUMENTS

| | | | |
|---|---|---|---|
| 6,023,417 A | 2/2000 | Hava et al. | |
| 6,121,734 A * | 9/2000 | Szabados | H05B 41/3927 315/209 R |
| 7,190,143 B2 | 3/2007 | Wei et al. | |
| 8,076,799 B2 * | 12/2011 | Wu | H02J 9/062 307/64 |
| 8,134,326 B2 * | 3/2012 | Hayashi | B62D 5/046 318/599 |
| 2007/0116109 A1 * | 5/2007 | Stanley | H03F 1/32 375/238 |
| 2007/0268051 A1 | 11/2007 | Kerkman et al. | |
| 2007/0296364 A1 | 12/2007 | Shoemaker et al. | |
| 2009/0174260 A1 * | 7/2009 | Wu et al. | 307/65 |
| 2010/0219780 A1 | 9/2010 | Morimoto et al. | |
| 2010/0244760 A1 * | 9/2010 | Anwar | G01R 31/025 318/490 |
| 2011/0187304 A1 * | 8/2011 | Anwar | G01R 31/06 318/490 |

FOREIGN PATENT DOCUMENTS

| | | |
|---|---|---|
| JP | 2004048885 A | 2/2004 |
| KR | 20070025658 A | 3/2007 |
| KR | 20100001889 A | 1/2010 |
| KR | 20100013335 A | 2/2010 |
| KR | 20110113549 A | 10/2011 |

* cited by examiner

Primary Examiner — Eduardo Colon Santana
Assistant Examiner — Cortez Cook
(74) Attorney, Agent, or Firm — Harness, Dickey & Pierce, PLC (57) ABSTRACT

A method of controlling an output voltage of an inverter driving an electric motor may include calculating a current total harmonic distortion (THD) of a current output to the electric motor; comparing the current THD with a reference current THD; determining a pulse width modulation (PWM) method to be changed from a first modulation method that reduces harmonic components of the current output to the electric motor to a second modulation method when the current THD is less than the reference current THD, the PWM method modulating a pulse width of a control pulse signal for controlling the output voltage of the inverter; and/or generating the control pulse signal based on the determined PWM method.

11 Claims, 5 Drawing Sheets

METHODS AND APPARATUSES FOR CONTROLLING OUTPUT VOLTAGES OF INVERTERS DRIVING ELECTRIC MOTORS

CROSS-REFERENCE TO RELATED APPLICATION(S)

This application claims priority from Korean Patent Application No. 10-2012-0100652, filed on Sep. 11, 2012, in the Korean Intellectual Property Office (KIPO), the entire contents of which are incorporated herein by reference.

BACKGROUND

1. Field

Some example embodiments may relate to methods and/or apparatuses for controlling output voltages of inverters driving electric motors. Some example embodiments may reduce harmonics over an entire range of power of the electric motor and/or increase efficiency of the electric motor.

2. Description of Related Art

Electrical motors that convert electrical energy into mechanical power are widely used in various applications such as electrical cars, industrial equipment, and electrical appliances. In order to generate a stable torque with high efficiency by using an electric motor, it is important to effectively control an inverter driving the electric motor. Various pulse width modulation (PWM) techniques have been employed to control an output voltage of an inverter.

Since harmonics in an output current or an output voltage applied to an electric motor may cause unnecessary loss such as heat or noise, a method of controlling an output voltage of an inverter is required for reducing harmonics over the entire range of power of the electric motor and increasing the efficiency of the electric motor.

SUMMARY

Some example embodiments may provide methods and/or apparatuses for controlling output voltages for driving electric motors. Some example embodiments may provide computer recordable recording mediums having stored thereon a program for executing the above methods.

In some example embodiments, a method of controlling an output voltage of an inverter driving an electric motor may comprise: calculating a current total harmonic distortion (THD) of a current output to the electric motor; comparing the current THD with a reference current THD; determining a pulse width modulation (PWM) method to be changed from a first modulation method that reduces harmonic components of the current output to the electric motor to a second modulation method when the current THD is less than the reference current THD, the PWM method modulating a pulse width of a control pulse signal for controlling the output voltage of the inverter; and/or generating the control pulse signal based on the determined PWM method.

In some example embodiments, the determining of the PWM method may comprise determining the PWM method to be changed from the second modulation method to the first modulation method when the current THD is greater than the reference current THD.

In some example embodiments, the second modulation method may reduce a switching frequency of the inverter.

In some example embodiments, the first and second modulation methods may be Space Vector Pulse Width Modulation (SVPWM) and Discontinuous Pulse Width Modulation (DPWM) techniques, respectively.

In some example embodiments, the generating of the control pulse signal may comprise generating the control pulse signal based on an offset signal corresponding to the determined PWM method.

In some example embodiments, the generating of the control pulse signal may comprise: generating an offset signal corresponding to the determined PWM method; generating a second command signal by adding the offset signal to a first command signal input for controlling the driving of the electric motor; and/or comparing magnitudes of the second command signal and a triangular carrier wave and generating the control pulse signal based on a comparison result.

In some example embodiments, the determining of the PWM method may comprise adaptively determining the PWM method for modulating a pulse width of the control pulse signal as the current THD changes according to the output voltage and a switching frequency of the inverter.

In some example embodiments, a computer-readable recording medium may have recorded thereon a program for executing a method of obtaining a maximum command magnetic flux of a permanent magnet synchronous motor.

In some example embodiments, an apparatus for controlling an output voltage of an inverter driving an electric motor may comprise: a total harmonic distortion (THD) calculation unit configured to calculate a current THD of a current output to the electric motor; a determination unit configured to compare the current THD with a reference current THD and, when the current THD is less than the reference current THD, configured to determine a pulse width modulation (PWM) method to be changed from a first modulation method that reduces harmonic components of the current output to the electric motor to a second modulation method, the PWM method configured to modulate a pulse width of a control pulse signal for controlling the output voltage of the inverter; and/or a generation unit configured to generate the control pulse signal based on the determined PWM method.

In some example embodiments, the determination unit may be configured to determine the PWM method to be changed from the second modulation method to the first modulation method when the current THD is greater than the reference current THD.

In some example embodiments, the second modulation method may reduce a switching frequency of the inverter.

In some example embodiments, the first and second modulation methods may be Space Vector Pulse Width Modulation (SVPWM) and Discontinuous Pulse Width Modulation (DPWM) techniques, respectively.

In some example embodiments, the generation unit may be configured to generate the control pulse signal based on an offset signal corresponding to the determined PWM method.

In some example embodiments, the generation unit may comprise: an offset signal generator configured to generate an offset signal corresponding to the determined PWM method; a second command signal generator configured to generate a second command signal by adding an offset signal to a first command signal input for controlling the driving of the electric motor; and/or a comparator configured to compare magnitudes of the second command signal and a triangular carrier wave and configured to generate the control pulse signal based on a comparison result.

In some example embodiments, the determination unit may be configured to adaptively determine the PWM method for modulating the pulse width of the control pulse signal as the current THD changes according to the output voltage and a switching frequency of the inverter.

In some example embodiments, an electric motor drive system for driving an electric motor may comprise: a current detector for configured to detect a current output to the electric motor; an controller configured to calculate a current total harmonic distortion (THD) of the current output to the electric motor, configured to compare a magnitude of the current THD with a magnitude of a reference current THD, configured to determine to change a pulse width modulation (PWM) method for modulating a pulse width of a control pulse signal for controlling an output voltage of an inverter when a comparison result changes, and configured to generate the control pulse signal based on the determined PWM method; and/or an inverter for configured to convert an input power into the output voltage based on the control pulse signal and configured to supply the output voltage to the electric motor.

In some example embodiments, the controller may be configured to determine the PWM method to be changed to a first modulation method that reduces harmonic components of the current output to the electric motor when the current THD has a magnitude greater than that of the reference current THD.

In some example embodiments, the controller may be configured to determine the PWM method to be changed to a second modulation method that reduces a switching frequency of the inverter when the current THD has a magnitude less than that of the reference current THD.

In some example embodiments, the controller may be configured to determine the PWM method to be changed to one of Space Vector Pulse Width Modulation (SVPWM) and Discontinuous Pulse Width Modulation (DPWM) techniques when the comparison result changes.

In some example embodiments, the controller may be configured to adaptively determine the PWM method as the current THD changes according to the output voltage and a switching frequency of the inverter.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
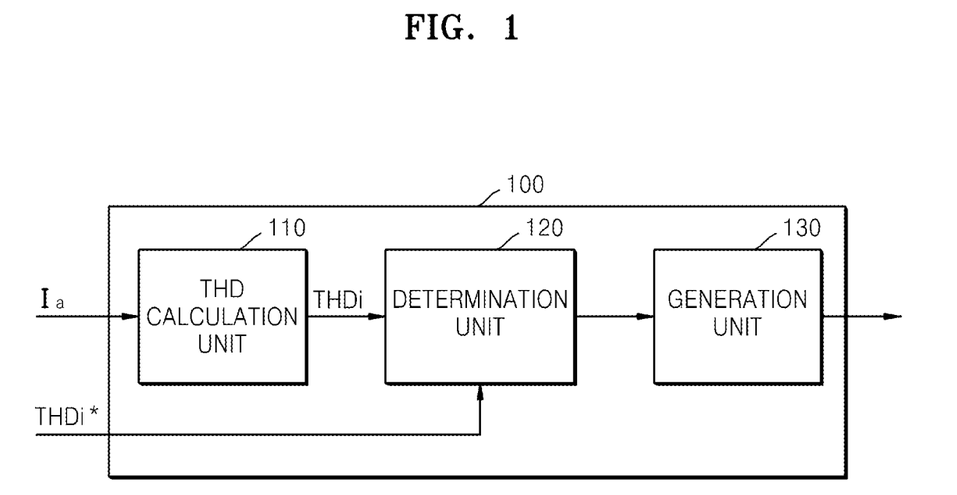
FIG. 1 is a block diagram of an apparatus for controlling an output voltage of an inverter according to some example embodiments.

FIG. 1 is a block diagram of an apparatus 100 for controlling an output voltage of an inverter according to some example embodiments. Referring to FIG. 1, the apparatus 100 includes a total harmonic distortion (THD) calculation unit 110, a determination unit 120, and a generation unit 130.

While FIG. 1 illustrates only components related to some example embodiments, it will be understood by a person of ordinary skill in the art that the apparatus 100 may further include other general-purpose components.

The apparatus 100 may be or include at least one processor. The apparatus 100 may be embedded in a microprocessor or another hardware device such as a general-purpose computer system.

Referring to FIG. 1, the apparatus 100 controls an output voltage of an inverter (not shown) driving an electric motor (not shown). The apparatus 100 is configured to generate a control pulse signal based on a current THD of the electric motor, and the inverter generates an output voltage according to the control pulse signal. The control pulse signal is referred to as a gating signal.

The THD calculation unit 110 calculates a current THD of a current detected in the electric motor. The harmonic distortion is a waveform distortion caused by harmonic components that are integer multiples of the waveform's fundamental frequency. The THD is a measure of a distortion degree of a waveform due to harmonic components, and may be defined as the ratio of total harmonic components to a fundamental frequency component. The THD may be calculated for current and/or voltage.

In some example embodiments, the THD calculation unit 110 receives current detected in the electric motor and calculates a current THD for the detected current. In this case, the current THD may be obtained by using Equation (1):

$$THD_i = \frac{\sqrt{I_a^2 - I_{a1}^2}}{I_{a1}} \quad (1)$$

where $THD_i$ denotes a current THD in the electric motor, and $I_a$ and $I_{a1}$ denote the current detected in the electric motor and a fundamental frequency component of the current $I_a$, respectively.

In this case, the current $I_a$ may be detected in the electric motor by using a shunt resistor or an instrumental current transformer. The fundamental frequency component $I_{a1}$ may be obtained by performing Fast Fourier Transform (FFT) on the detected current $I_a$.

In Equation (1), the numerator is an effective value of the detected current $I_a$ minus the fundamental frequency component $I_{a1}$ and represents all harmonic components of the current $I_a$. The denominator represents the fundamental frequency component $I_{a1}$. Thus, as described above, the current $THD_i$ is expressed as the ratio of all harmonic components of the current $I_a$ to the fundamental frequency component $I_{a1}$.

In this manner, the THD calculation unit 110 calculates the current THD based on the current detected in the electric motor and outputs the current THD to the determination unit 120.

The determination unit 120 compares the current THD of the detected current $I_a$ with a reference current $THD_i^*$. When the current THD is less than the reference current THD, the determination unit 120 determines a pulse-width modulation (PWM) method to be changed from a first modulation method to a second modulation methods.

In this case, the PWM method refers to a technique for modulating the pulse width of a control pulse signal for controlling an output voltage of the inverter. The magnitude and frequency of an output voltage from the inverter is changed as switching elements of the inverter are switched on or off according to a control pulse signal. Thus, the amount of harmonic components of the output voltage and a current output to the electrical motor and switching losses of the switching elements of the inverter may vary with a technique of modulating the pulse width of the control pulse signal.

The apparatus 100 changes the PWM method to the first or second modulation method in order to minimize distortion due to harmonics over the entire range of power of the electrical motor while increasing the efficiency of the output voltage to the electric motor.

The determination unit 120 changes the PWM method to one of the first or second modulation methods based on the current THD. Here, the current THD varies according to the output voltage of the inverter and a switching frequency of the inverter. Thus, the apparatus 100 is configured to adaptively determine the PWM method depending on changes in the output voltage and switching frequency of the inverter.

The reference current THD is used as a reference value to change PWM method from the first modulation method to the second modulation method. More specifically, when the current THD is less than the reference current THD, the determination unit 120 changes the PWM method from the first modulation method which reduces harmonic components to the second modulation method, thereby increasing the efficiency of the output voltage.

Here, the second modulation method reduces the switching frequency of the inverter. Thus, the apparatus 100 decreases switching losses caused by switching of switching elements of the inverter by changing the PWM method from the first modulation method to the second modulation method when the current THD is less than the reference current THD.

Conversely, when the current THD is greater than the reference current THD, the determination unit 120 determines a PWM method to be changed from the second modulation method to the first modulation method so as to reduce the harmonic components in the output voltage of the inverter.

In one embodiment, the first and second modulation methods may be Space Vector Pulse Width Modulation (SVPWM) and Discontinuous Pulse Width Modulation (DPWM) techniques, respectively.

In the SVPWM technique, output voltages that may be generated by the inverter are represented by a space vector on a complex number space. The SVPWM technique modulates a pulse width of a control pulse signal according to the space vector. Compared to other PWM techniques, the SVPWM technique provides a maximum output voltage by using the same input voltage to the inverter and less harmonic components in an output voltage or output current supplied to the electric motor.

The DPWM technique is used to modulate a pulse width of a control pulse signal so that only switching elements of two phases among switching elements of three phases are switched within each switching period of the switching elements of the inverter for outputting three-phase output voltages. Thus, the DPWM technique provides a reduced number of switchings and minimizes switching losses of the switching elements compared to other PWM methods.

If a current THD is greater than a reference current THD, the determination unit 120 uses a SVPWM technique in order to reduce the harmonic components in an output current of the inverter. On the other hand, if the current THD is less than the reference current THD, the determination unit 120 uses a DPWM technique so as to minimize switching losses in the inverter.

The generation unit 130 generates a control pulse signal based on the determined PWM method and outputs the control pulse signal to the inverter.

When the current THD is high, the apparatus 100 according to some example embodiments reduces the amount of harmonic components in the output current, thereby decreasing losses due to harmonics. When the current THD is low, the apparatus 100 changes the PWM method to provide high efficiency of the output voltage to the electric motor instead of reducing the amount of harmonic components in the output current.

By changing the PWM method based on the current THD, the apparatus 100 may adaptively determine the PWM method according to changes in the output voltage and switching frequency of the inverter.

Figure 2:
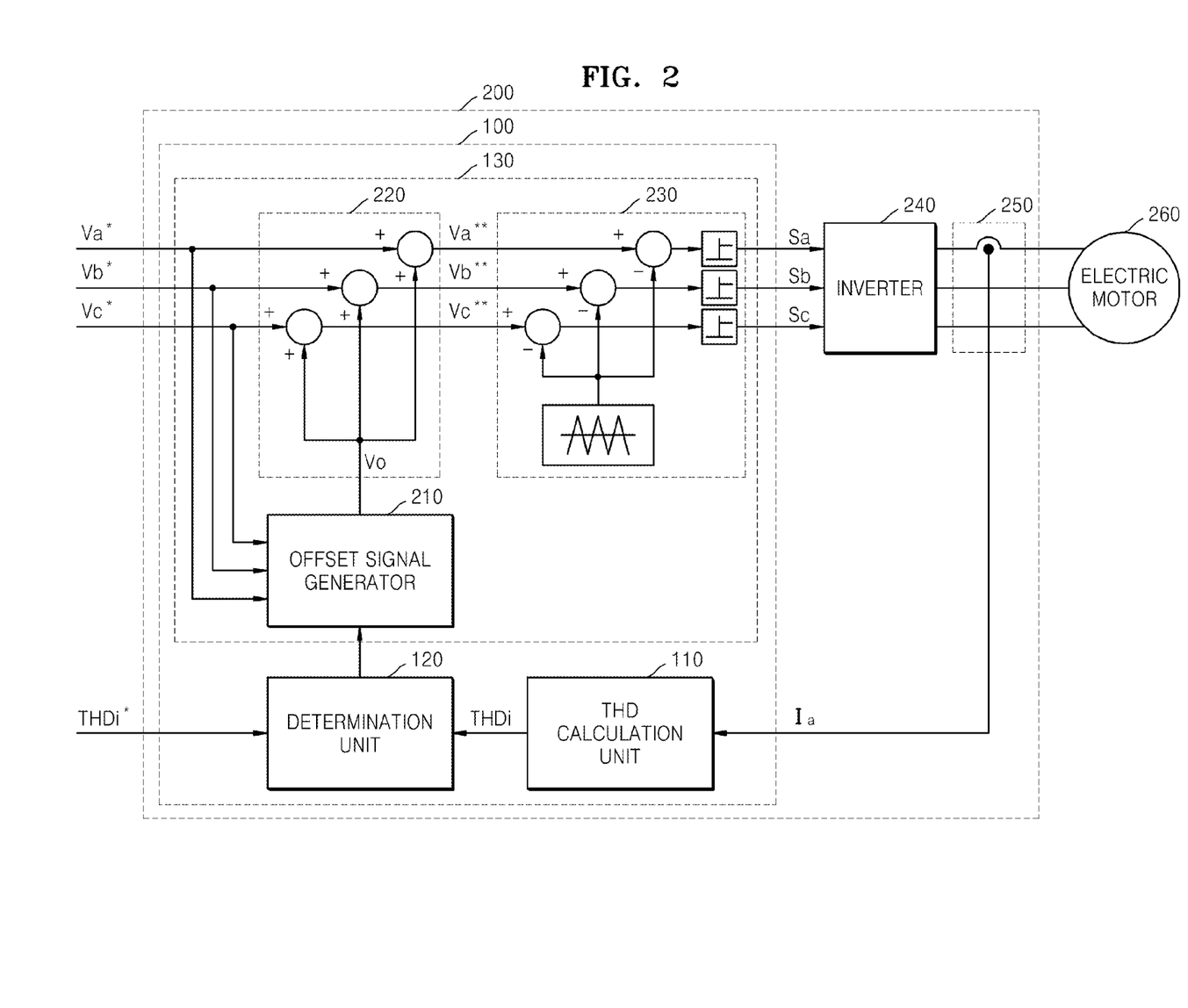
FIG. 2 illustrates an electric motor drive system for controlling driving of an electric motor by using the apparatus of FIG. 1.

FIG. 2 illustrates an electric motor drive system 200 for controlling driving of an electric motor by using the apparatus of FIG. 1. Referring to FIG. 2, the electric motor drive system 200 includes the apparatus 100, an inverter 240, and a current detector 250. The apparatus 100 includes the THD calculation unit 110, the determination unit 120, and the generation unit 130. The generation unit 130 includes an offset signal generator 210, a second command signal generator 220, and a comparator 230.

FIG. 2 illustrates only components related to some example embodiments. However, it will be understood by a person of ordinary skill in the art that the electric motor drive system 200 may further include other general-purpose components.

The descriptions with respect to the apparatus 100 in FIG. 1 are included in the descriptions of the apparatus 100 in FIG. 2, and thus, are not repeated.

The apparatus 100 controls an output voltage of the inverter 240 that drives an electric motor 260. The apparatus 100 generates a control pulse signal based on a first command signal Vabc* (e.g., Va*, Vb*, Vc*) input for controlling driving of the electric motor 260 and a current $I_a$ detected by the current detector 250. The output voltage of the inverter 240 is controlled according to the control pulse signal.

The THD calculation unit 110 calculates a current THD of the current $I_a$ detected in the electric motor 260. As explained before, THD is a measure of the distortion degree of a waveform due to harmonic components, and may be defined as the ratio of total harmonic components of a detected current to a fundamental frequency component thereof. Here, the fundamental frequency component of the detected current $I_a$ is obtained by performing FFT on the detected current $I_a$. The THD calculation unit 110 outputs the current THD $THD_i$ to the determination unit 120.

The determination unit 120 compares the magnitude of the current THD $THD_i$ with the magnitude of a reference current THD $THD_i$* and determines the PWM method for modulating a pulse width of a control pulse signal for controlling an output voltage of the inverter 240 depending on a change in the comparison result.

More specifically, when the current THD $THD_i$ has a magnitude greater than that of the reference current THD $THD_i$*, the determination unit 120 determines the PWM method to be changed to a first modulation method in order to reduce the harmonic components of the output current.

Conversely, when the current THD $THD_i$ has a magnitude less than that of the reference current THD $THD_i$*, the determination unit 120 determines the PWM method to be changed to a second modulation method in order to reduce the switching frequency of the inverter 240.

According to one embodiment, when the result of comparison between the current THD $THD_i$ and the reference current THD $THD_i$* changes, the determination unit 120 changes the PWM method to either of SVPWM and DPWM.

The PWM method is employed to modulate the pulse width of a control pulse signal for controlling an output voltage of the inverter 240. The amount of harmonic components in output voltage and output current supplied to the electric motor 260 and switching losses of switching elements in the inverter 240 may vary with a technique of modulating the pulse width of the control pulse signal.

The determination unit 120 changes the PWM method into a first or second modulation method, thereby minimizing distortion due to harmonics while increasing the efficiency of the output voltage to the electric motor.

Here, the current THD varies with the output voltage and switching frequency of the inverter 240. When changing the PWM method to either the first or second modulation method based on the current THD $THD_i$, the determination unit 120 adaptively determines the PWM method according to changes in the output voltage and switching frequency of the inverter 240.

The generation unit 130 generates a control pulse signal by using the determined PWM method. Referring to FIG. 2, the generation unit 130 includes the offset signal generator 210, the second command signal generator 220, and the comparator 230.

The offset signal generator 210 generates an offset signal Vo by using the determined PWM method. The offset signal Vo is also referred to as a zero-sequence signal. More specifically, in order to modulate the pulse width of the control pulse signal by using the determined PWM method, the apparatus 100 according to some example embodiments generates an offset signal corresponding to the determined PWM method and adds the offset signal to a command voltage input for controlling the driving of the electric motor 260.

According to some example embodiments, the inverter 240 outputs output voltages of three-phases. Thus, although an offset signal is added to each of the output voltages of three-phases, a voltage corresponding to subtraction between output voltages of two phases from among output voltages of three phases is applied to a load of the electric motor 260, thereby removing the offset signal component.

The second command signal generator 220 receives the first command signal Vabc* and the offset signal Vo, adds the offset signal Vo to the first command signal Vabc* to generate a second command signal Vabc (e.g., Va, Vb, Vc), and outputs the second command signal Vabc to the comparator 230**.

The comparator 230 compares the magnitude of the second command signal Vabc** with that of a triangular carrier wave and generates a control pulse signal Sabc (e.g., Sa, Sb, Sc) based on a comparison result.

More specifically, the comparator 230 compares the magnitude of the second command signal Vabc with that of the triangular carrier wave to determine the on-off state of the control pulse signal. For example, if the second command signal Vabc has a magnitude greater than that of the triangular carrier wave, the comparator 230 determines that the control pulse signal is in an on state. On the other hand, if the second command signal Vabc has a magnitude less than that of the triangular carrier wave, the comparator 230** determines that the control pulse signal is in an off state.

That is, the comparator 230 generates a control pulse signal based on the on/off state of the control pulse signal, which is determined according to the comparison result, and outputs the control signal to the inverter 240. As described above, the control signal is generated based on the PWM method determined according to the current THD.

The inverter 240 receives the control pulse signal from the apparatus 100, converts an input power according to the received control pulse signal into an output voltage, and outputs the output voltage to the electric motor 260. The output voltage of the inverter 240 is controlled based on the first command signal Vabc* input to control the driving of the electric motor 260 and a current detected by the current detector 250. In this case, the inverter 240 may be a voltage source inverter (VSI) or current source inverter (CSI).

According to some example embodiments, the inverter 240 is a PWM inverter that is driven according to a PWM method. A switching element in the inverter 240 is switched on/off according to the control pulse signal. By modulating the on/off pulse width of the control pulse signal in the apparatus 100, the magnitude and frequency of an output voltage from the inverter 240 are controlled. The inverter 240 supplies an output voltage generated according to the control pulse signal to the electric motor 260.

The current detector 250 detects a current in the operating electric motor 260. The apparatus 100 according to some example embodiments obtains a current THD of the current detected in real time by the current detector 250 and changes the PWM method based on the current THD, thereby adaptively determining the PWM method according to changes in the switching frequency of the inverter 240 and output voltage applied to the electric motor 260. The current detector 250 may be implemented using a shunt resistor or instrumental current transformer.

The electric motor 260 is driven by an output voltage received from the inverter 240 to generate a torque required to drive a load. The driving of the electric motor 260 is controlled based on the current detected $I_a$ in the electric motor 260 and the first command signal Vabc* input to control the driving of the electric motor 260.

Since the amount of harmonic components of the output voltage and output current input to the electric motor 260 varies with the switching frequency and an output voltage range of the inverter 240, the apparatus 100 is configured to change the PWM method based on a current THD in order to minimize distortions due to harmonics over the entire range of power of the electric motor 260 and maximize the efficiency of the output voltage of the electric motor 260. Thus, when the current THD is high, the apparatus 100 is configured to reduce the amount of harmonic components in the output current input to the electric motor 260, thereby decreasing the losses due to harmonics. When the current THD is low, the apparatus 100 changes the PWM method to increase the efficiency of the output voltage of the inverter 240 instead of reducing the amount of harmonic components in the output current.

Thus, the apparatus 100 according to some example embodiments allows driving of the electric motor 260 with low harmonic noise and high efficiency.

The apparatus 100 also adaptively determines the PWM method for modulating a control pulse signal according to changes in the output voltage and switching frequency of the inverter 240 in accordance with the current THD. Thus, the apparatus 100 may be used in conjunction with any electric motors regardless of a range of output voltage and a range of switching frequencies of an inverter.

Figure 3:
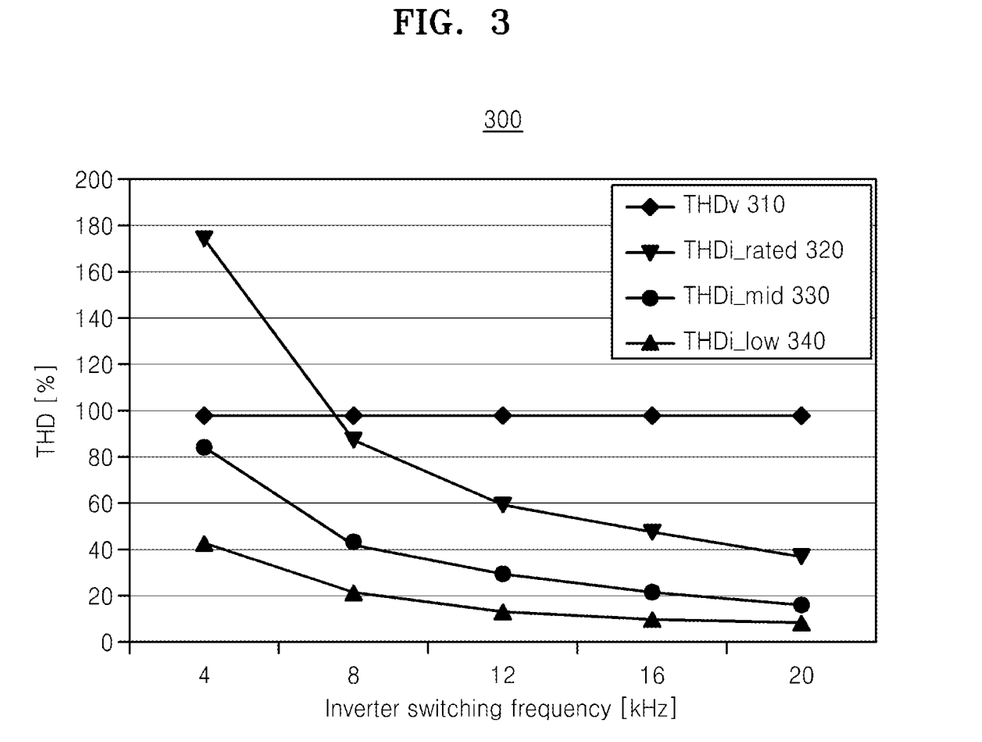
FIG. 3 is a graph of a current or voltage total harmonic distortion (THD) vs. an inverter switching frequency.

FIG. 3 is a graph 300 of current or voltage THD (%) vs. inverter switching frequency (kHz). The abscissa and ordinate in the graph 300 denote a THD and a switching frequency of the inverter 240, respectively. THDv 310 denotes a voltage THD with respect to an inverter switching frequency, which means the amount of harmonic components in an output voltage supplied to the electric motor 260. The voltage THD THDv 310 remains constant regardless of a range of an output voltage of the electric motor 260.

However, the current THD varies according to a range of the output voltage of the electric motor 260. THDi_rated 320, THDi_mid 330, and THDi_low 340 denote current THDs with respect to the switching frequency of an inverter for respective output voltages. More specifically, THDi_rated 320 represents a current THD with respect to a switching frequency for a rated output voltage. THDi_low 340 represents a current THD with respect to a switching frequency when an output voltage is lower than the rated output voltage. THDi_mid 330 represents a current THD with respect to a switching frequency when an output voltage is between the rated output voltage and the output voltage for THDi_low 340.

Referring to FIG. 3, the voltage THD THDv 310 maintains a constant value over the entire range of switching frequencies of the inverter 240, while the current THDs THDi_rated 320, THDi_mid 330, and THDi_low 340 vary according to a switching frequency of an inverter. As apparent from the graph 300, the current THDs, THDi_rated 320, THDi_mid 330, and THDi_low 340, increase as the output voltage range of the electric motor 260 increases and the switching frequency of the inverter 240 decreases.

By changing the PWM method according to a current THD instead of a voltage THD, the apparatus 100 according to some example embodiments may adaptively determine the PWM method according to changes in the switching frequency of the inverter 240 and output voltage supplied to the electric motor 260.

Figure 4:
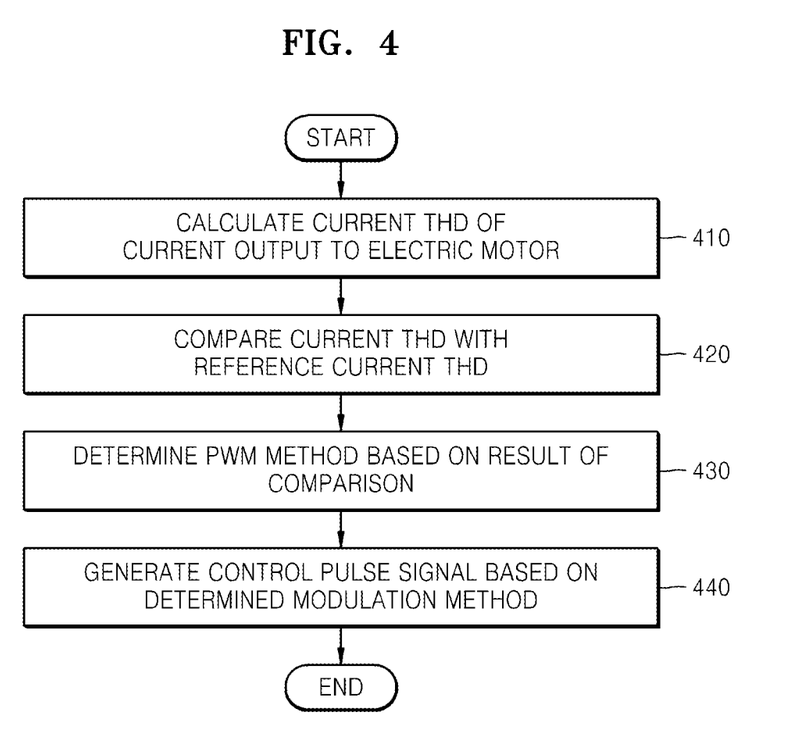
FIG. 4 is a flowchart of a method for controlling an output voltage of an inverter driving an electric motor according to some example embodiments.

FIG. 4 is a flowchart of a method for controlling an output voltage of an inverter driving an electric motor according to some example embodiments. Referring to FIG. 4, the method includes time-series operations 410 through 440. The above descriptions of the apparatus 100 with reference to FIGS. 1 and 2 are also included in the description of the method illustrated in FIG. 4.

The THD calculation unit (110 in FIG. 1) calculates a current THD of a current detected in the electric motor (260 in FIG. 2) (operation 410). The determination unit (120 in FIG. 1) compares the current THD with a reference current THD (operation 420).

The determination unit (120) determines the PWM method for modulating a pulse width of a control pulse signal for controlling an output voltage of the inverter (240 in FIG. 2) based on the result of comparison (operation 430). For example, if the current THD is less than the reference current THD, the determination unit 120 determines a second modulation method as the PWM method for reducing a switching frequency of the inverter. . If the current THD is greater than the reference current THD, the determination unit 120 determines a first modulation method as the PWM method for reducing harmonic components in an output voltage.

The magnitude of an output voltage supplied to the electric motor 260, harmonic components in an output current supplied to the electric motor 260, and switching losses in switching elements of the inverter 240 may vary with a technique of modulating a pulse width of a control pulse signal.

Thus, the apparatus 100 changes the PWM method to the first or second modulation method in order to minimize distortions due to harmonics over the entire range of power of the electrical motor 260 and maximize the efficiency of the electrical motor 260.

The generation unit (130 in FIG. 1) generates a control pulse signal according to the PWM method (operation 440), and the control pulse signal is output to the inverter 240.

According to some example embodiments, by changing the PWM method based on the current THD, the apparatus 100 may adaptively determine the PWM method according to changes in an output voltage applied to the electric motor 260 and a switching frequency of the inverter 240.

Figure 5:
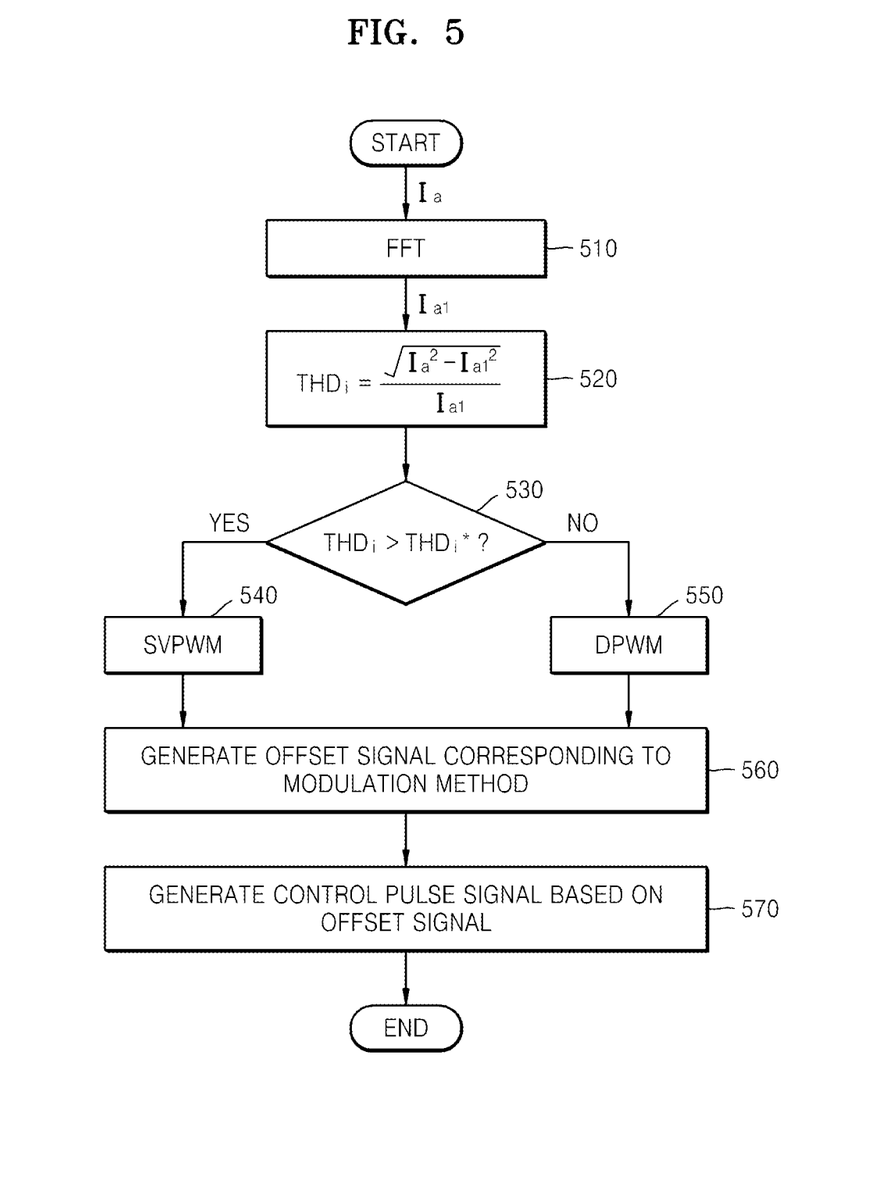
FIG. 5 is a flowchart of a method for controlling an output voltage of an inverter driving an electric motor according to some example embodiments.

FIG. 5 is a flowchart of a method for controlling an output voltage of the inverter 240 driving the electric motor 260 according to some example embodiments. Referring to FIG. 5, the method illustrated in FIG. 5 includes time-series operations 510 through 570. The above descriptions of the apparatus 100 with reference to FIGS. 1 and 2 are included in the description of the method illustrated in FIG. 5.

The THD calculation unit 110 receives a current $I_a$ detected in the electric motor 260 by the current detector 250 and performs FFT on the detected current $I_a$ to obtain a fundamental frequency component $I_{a1}$ (operation 510).

The THD calculation unit 110 uses the detected current $I_a$ and the fundamental frequency component $I_{a1}$ to calculate a current THD $THD_i$ (operation 520). The current THD $THD_i$ is expressed as the ratio of all harmonic components of the current $I_a$ to the fundamental frequency component $I_{a1}$. The current THD $THD_i$ may be calculated by using Equation (1) above.

The determination unit 120 compares the current THD $THD_i$ obtained in operation 520 with a reference current THD $THD_i^*$ input to the apparatus 100 (operation 530). When the current THD $THD_i$ is greater than the reference current THD $THD_i^*$, the method proceeds to operation 540. When the current THD $THD_i$ is less than the reference current THD $THD_i^*$, the method proceeds to operation 550.

The determination unit 120 changes the PWM method for modulating a pulse width of a control pulse signal for controlling an output voltage of the inverter 240 (operation 540) to a SVPWM technique. The SVPWM technique may reduce harmonic components in the output current of the inverter 240.

The determination unit 120 changes the PWM method to a DPWM technique that provides reduced switching losses and supplies the output voltage to the electric motor 260 with improved efficiency (operation 550).

The generation unit 130 generates an offset signal according to the PWM method changed in operation 540 or 550 (operation 560).

The generation unit 130 generates a control pulse signal based on the offset signal generated in operation 560 (operation 570), and the control pulse signal is output to the inverter 240.

When the current THD is high, the apparatus 100 according to some example embodiments determines a PWM method as a SVPWM technique in order to reduce harmonic components of the output current of the inverter 240. Conversely, when the current THD is low, the apparatus 100 changes the PWM method to a DPWM technique in order to provide the output voltage to the electric motor 260 with improved efficiency without reducing the number of harmonic components.

Accordingly, the apparatus 100 may minimize harmonic distortions over the entire range of the output voltage of the inverter 240 while increasing the efficiency of the output voltage of the inverter 240.

The method and apparatus are also capable of adaptively determining the PWM method according to an output voltage and switching a frequency of an inverter by determining the PWM method according to the current THD.

Some example embodiments can be recorded in programs that can be executed on a computer and be implemented through general purpose digital computers which can run the programs using a computer readable recording medium. Data structures described in the above embodiments can be recorded on a medium in a variety of ways, with examples of the medium including recording media, such as magnetic storage media (e.g., Read-Only Memory (ROM), floppy disks, hard disks, etc.) and optical recording media (e.g., Compact Disc (CD)-ROMs, or Digital Versatile Disk (DVD)).

While example embodiments have been particularly shown and described, it will be understood by those of ordinary skill in the art that various changes in form and details may be made therein without departing from the spirit and scope of the present invention as defined by the following claims.

What is claimed is:

1. A method of controlling an output voltage of an inverter driving an electric motor, the method comprising:
    calculating a current total harmonic distortion (THD) of a current output to the electric motor;
    comparing the current THD with a reference current THD;
    adaptively determining a pulse width modulation (PWM) method to be changed from a first modulation method, that reduces harmonic components of the current output to the electric motor, to a second modulation method, that reduces a switching frequency of the inverter, when the current THD is less than the reference current THD, and to be changed from the second modulation method to the first modulation method when the current THD is greater than the reference current THD, the PWM method modulating a pulse width of a control pulse signal for controlling the output voltage of the inverter; and
    generating the control pulse signal based on the determined PWM method;
    wherein the adaptively determining of the PWM method comprises adaptively determining the PWM method for modulation the pulse width of the control pulse signal as the current THD changes according to the output voltage and the switching frequency of the inverter.

2. The method of claim 1, wherein the first and second modulation methods are Space Vector Pulse Width Modulation (SVPWM) and Discontinuous Pulse Width Modulation (DPWM) techniques, respectively.

3. The method of claim 1, wherein the generating of the control pulse signal comprises generating the control pulse signal based on an offset signal corresponding to the determined PWM method.

4. The method of claim 1, wherein the generating of the control pulse signal comprises:
    generating an offset signal corresponding to the determined PWM method;
    generating a second command signal by adding the offset signal to a first command signal input for controlling the driving of the electric motor; and comparing magnitudes of the second command signal and a triangular carrier wave, and generating the control pulse signal based on a result of the comparing.

5. A computer-readable recording medium having recorded thereon a program for executing the method of claim 1.

6. An apparatus for controlling an output voltage of an inverter driving an electric motor, the apparatus comprising:
a total harmonic distortion (THD) calculation unit configured to calculate a current THD of a current output to the electric motor;
a determination unit configured to compare the current THD with a reference current THD and configured to adaptively determine a pulse width modulation (PWM) method to be changed from a first modulation method, that reduces harmonic components of the current output to the electric motor, to a second modulation method, that reduces a switching frequency of the inverter, when the current THD is less than the reference current THD, and to be change from the second modulation method to the first modulation method when the current THD is greater than the reference current THD, the PWM method configured to modulate a pulse width of a control pulse signal for controlling the output voltage of the inverter; and
a generation unit configured to generate the control pulse signal based on the determined PWM method;
wherein the determination unit is further configured to adaptively determine the PWM method for modulating the pulse width of the control pulse signal as the current THD changes according to the output voltage and the switching frequency of the inverter.

7. The apparatus of claim 6, wherein the first and second modulation methods are Space Vector Pulse Width Modulation (SVPWM) and Discontinuous Pulse Width Modulation (DPWM) techniques, respectively.

8. The apparatus of claim 6, wherein the generation unit is further configured to generate the control pulse signal based on an offset signal corresponding to the determined PWM method.

9. The apparatus of claim 6, wherein the generation unit comprises:

an offset signal generator configured to generate an offset signal corresponding to the determined PWM method;
a second command signal generator configured to generate a second command signal by adding the offset signal to a first command signal input for controlling the driving of the electric motor; and
a comparator configured to compare magnitudes of the second command signal and a triangular carrier wave, and configured to generate the control pulse signal based on a result of the comparing.

10. An electric motor drive system for driving an electric motor, the system comprising:
a current detector configured to detect a current output to the electric motor;
a controller configured to calculate a current total harmonic distortion (THD) of the current output to the electric motor, configured to compare a magnitude of the current THD with a magnitude of a reference current THD, configured to adaptively determine a pulse width modulation (PWM) method to be changed from a first modulation method, that reduces harmonic components of the current output to the electric motor, to a second modulation method, that reduces a switching frequency of the inverter, when the current THD is less than the reference current THD, and the be changed from the second modulation method to the first modulation method when the current THD is greater than the reference current THD, and configured to generate a control pulse signal based on the determined PWM method; and
an inverter configured to convert an input power into an output voltage based on the control pulse signal and configured to supply the output voltage to the electric motor;
wherein the controller is further configured to adaptively determine the PWM method as the current THD changes according to the output voltage and the switching frequency of the inverter.

11. The system of claim 10, wherein the controller is further configured to determine the PWM method to be changed to one of Space Vector Pulse Width Modulation (SVPWM) and Discontinuous Pulse Width Modulation (DPWM) techniques when a result of the comparing changes.

* * * * *